— 3,052,726 —
ALPHA-HYDRO-BETA FLUOROALKYL
ALLYL SULFIDES
William J. Middleton, Claymont, Del., assignor to E. I. du Pont de Nemours and Company, Wilmington, Del., a corporation of Delaware
No Drawing. Filed Nov. 2, 1959, Ser. No. 850,035
15 Claims. (Cl. 260—609)

This invention relates to, and has as particular objects provision of, novel allyl sulfides containing fluorine and a process for the preparation of the same.

Monomeric compounds containing divalent sulfur are an important class of products. They are generally reactive, e.g., entering oxidation or crosslinking reactions. Fluorinated organic compounds of various types are known. Although certain fluorinated compounds exhibit biological activity, the presence of fluorine generally increases stability of the compound. Advantage of this stability is taken in certain fluorinated polymers. A combination of several moieties, e.g., sulfide, fluorine, and carbon-to-carbon unsaturation, should provide an interesting type of compounds.

There has now been obtained a new class of fluorine- and sulfur-containing organic compounds, namely, α-hydro-β-fluoroalkyl allyl sulfides, by the reaction of an α-fluoroalkylthioketone with a monomeric compound containing non-conjugated ethylenic unsaturation and which has hydrogen attached to a carbon adjacent to ethylenic carbon. The reaction and product obtained for the preferred reactants and products can be illustrated by the equation:

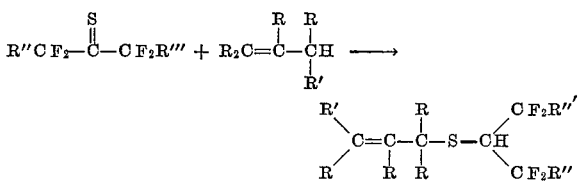

wherein R″ and R‴ are hydrogen halogen, hydrocarbon or halogenated hydrocarbon radical, R′ is hydrogen or monovalent radical (particularly including hydrocarbon and radicals hydrolyzable to carboxyl), and each R is a hydrogen, hydrocarbon or oxygen-containing hydrocarbon radical.

The reaction involves mixing the ethylenically unsaturated monomer with the fluorothioketone. No special catalysts or conditions such as high pressure or temperature are required. The conditions employed are generally such that the thioketone is present in monomeric form and both reactants are in liquid phase. Inert diluents or solvents such as petroleum ether can be present but are generally unnecessary. In general the temperature is preferbaly −80° to 50° C. The time is not critical, being somewhat dependent upon the temperature.

The new products are generally liquids and usually purified by distillation at reduced pressure. When higher olefinic compounds are employed, the products are more readily isolated by removal of unreatced thiocarbonyl compounds and solvent.

The following examples further illustrate the preparation of new compositions included within this invention. In these examples all pressures are ambient atmospheric unless otherwise noted.

EXAMPLE I

*Tetramethylethylene and Hexafluorothioacetone*

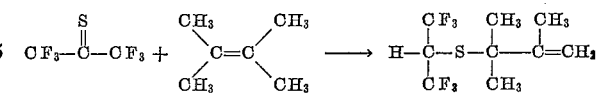

Tetramethylethylene, 4.2 g. (0.05 mole), was placed in a receiver and cooled to −78° C. Hexafluorothioacetone was distilled into the receiver until a faint blue color persisted. The reaction mixture was allowed to warm to room temperature and then distilled. There was obtained 9.7 g. (72%) of 2H-hexafluoro-2-propyl 1,1,2-trimethylallyl sulfide as a colorless oil, B.P. 61° C./20 mm.; $n_D^{22.3}$, 1.3970.

Analysis.—Calcd. for $C_9H_{12}F_6S$: C, 40.6; H, 4.5; F, 42.8; S, 12.0. Found: C, 41.2; H, 4.78; F, 41.47; S, 11.82.

The infrared spectrum of this product contains bands at 3.22μ (=CH), 3.35, 3.4, and 3.45μ (sat. CH), 6.1μ (C=C), and 11.3μ (terminal methylene). The fluorine n-m-r spectrum contained a single peak split to a doublet.

EXAMPLE II

*Propylene and Hexafluorothioacetone*

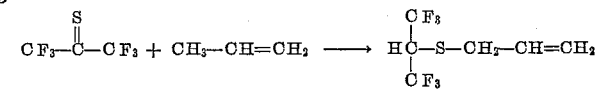

Propylene, 7 ml. (4.2 g., 0.1 mole), was condensed in a calibrated receiver and cooled to −78° C. Hexafluorothioacetone was distilled into the receiver until a faint blue persisted. The reaction mixture was allowed to warm to room temperature and then distilled. There was obtained 18.7 g. (84%) of 2H-hexafluoro-2-propyl allyl sulfide as a colorless oil, B.P. 57–58° C./100 mm.; $n_D^{23.7}$, 1.4362.

Analysis.—Calcd. for $C_6H_6F_6S$: C, 32.1; H, 2.7; F, 50.8; S, 14.3. Found: C, 32.45; H, 2.93; F, 50.61; S, 14.32.

EXAMPLE III

*Cyclopentene and Hexafluorothioacetone*

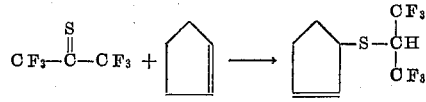

Cyclopentene, 6.8 g. (0.1 mole), was placed in a receiver and cooled to −78° C. Hexafluorothioactone was distilled into the receiver until a faint blue color persisted. The reaction mixture was allowed to warm to room temperature and then distilled. There was obtained 19.3 g. (76%) of 2H-hexafluoro-2-propyl 3-cyclopentenyl sulfide as a colorless oil, B.P. 67° C./21 mm.; $n_D^{22.8}$, 1.4030.

Analysis.—Calcd. for $C_8H_8F_6S$: C, 38.4; H, 3.2; F, 45.6; S, 12.8. Found: C, 38.95; H, 3.48; F, 45.58; S, 13.25.

A saturated solution of polychlorodifluorothioacetyl fluoride in the product described above was prepared. A No. 18 copper wire was passed through this viscous solution so that a thin film of liquid adhered to the wire. The wire was then passed through methanol, and an adherent coat of polymer formed on the wire serving as an insulation.

EXAMPLE IV

*Heptene-1 and Hexafluorothioacetone*

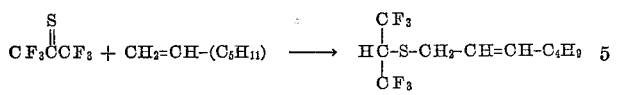

Heptene-1, 4.9 g. (0.05 mole) was placed in a receiver and cooled to —78° C. Hexafluorothioacetone was then distilled into the receiver until a faint blue color persisted. The reaction product was distilled to give 11.9 g. of 2H-hexafluoro-2-propyl 2-heptenyl sulfide, B.P. 51° C./3.5 mm.; $n_D^{25.5}$, 1.3940.

*Analysis.*—Calcd. for $C_{10}H_{14}F_6S$: C, 42.85; H, 5.03; F, 40.68; S, 11.44. Found: C, 43.31; H, 5.27; F, 40.52; S, 11.32.

EXAMPLE V

*Allyl Cyanide and Hexafluorothioactone*

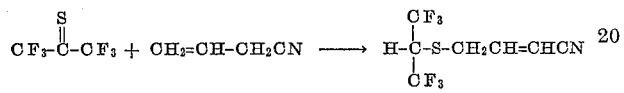

Allyl cyanide, 9 ml., was added dropwise to 9.1 g. (0.05 mole) of hexafluorothioactone cooled to —78° C. The reaction mixture was allowed to warm to room temperature and then distilled. There was obtained 5.78 g. (46%) of 4-(2H-hexafluoro-2-propylthio)-2-butenenitrile as a colorless oil, B.P. 75–76° C./1 mm.; $n_D^{24.5}$, 1.4119.

*Analysis.*—Calcd. for $C_7H_5F_6NS$: C, 33.74; H, 2.02; F, 45.76; N, 5.62; S, 12.87. Found: C, 33.96; H, 2.48; F, 45.19; N, 5.69; S, 12.65.

EXAMPLE VI

*Linseed Oil and Hexafluorothioacetone*

A 5% solution of linseed oil in xylene was cooled to about 0° C. and perfluorothioacetone monomer added until a blue-violet color persisted for about a minute. The product which resulted exhibited little reactivity with bromine and did not harden on exposure to air even in the presence of a cobalt drier.

In a similar manner, soybean oil, tung oil, and a commercial alkyd resin reacted with perfluorothioacetone to give non-drying products.

The new sulfides of this invention have fluorine and ethylenic unsaturation. They have attached to sulfur on one side a carbon which bears one and only one hydrogen and two polyfluoroalkyl groups. They also have an ethylenic unsaturation in the βγ-position to the sulfide group. The compounds can be represented by the formula:

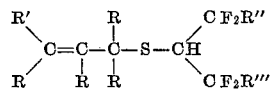

wherein R″ and R‴ represent hydrogen, halogen, hydrocarbon, or halohydrocarbon of up to 6 carbons and preferably of up to 3 carbons and wherein halogen is fluorine or chlorine; R′ is hydrogen, hydrocarbon, or contains a carboxylic group or radical hydrolyzable to carboxy (i.e., cyano or ester); and each R is hydrogen or aliphatic hydrocarbon of preferably up to 4 carbons. In the above one of the R groups can be joined to R′ to form an alicyclic carbon ring. Since glycerides containing non-conjugated ethylenic unsaturation are operable, R′ in the above formula can have a carbon content considerably higher than usually viewed as permissible in the reaction forming the new products; thus with glyceride in linseed oil, the R′ residue can be as high as about 49 carbons.

In the reaction, the olefinic compound has been represented as having the formula $R_2C=C(R)C(R)(R')H$. These compounds contain an allylic hydrogen (i.e., hydrogen on carbon joined to the ethylenic group) and have isolated unsaturation (i.e., the ethylenic bond is not conjugated with any other multiple bond). In the above formula each R is hydrogen or hydrocarbon of generally up to 8 carbons and the R′ is hydrogen, hydrocarbon, cyano, or carboxylic ester containing hydrocarbyl radicals of as high as about 50 carbons.

In addition to the olefinic compounds more specifically described in the examples, the general procedure can be applied to heneicosene, melene, cerotene, 2,5-dimethylcyclohexene, and methylenecyclohexane to give new sulfides as per the following equations:

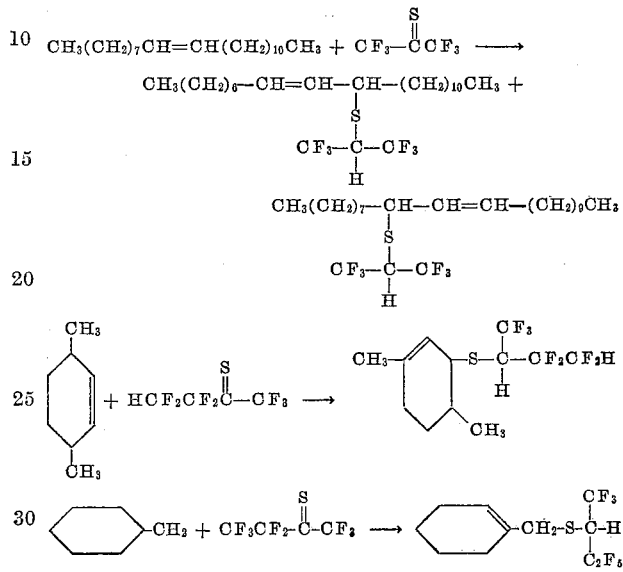

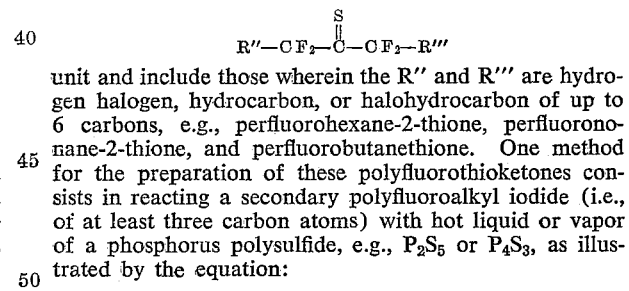

The fluorine-containing thioketones for reaction with the non-conjugated ethylenically unsaturated compounds are those containing difluoromethylene radicals directly attached to the thiocarbonyl carbon. Such compounds have the $$R''-CF_2-\overset{S}{\underset{\|}{C}}-CF_2-R'''$$

unit and include those wherein the R″ and R‴ are hydrogen halogen, hydrocarbon, or halohydrocarbon of up to 6 carbons, e.g., perfluorohexane-2-thione, perfluorononane-2-thione, and perfluorobutanethione. One method for the preparation of these polyfluorothioketones consists in reacting a secondary polyfluoroalkyl iodide (i.e., of at least three carbon atoms) with hot liquid or vapor of a phosphorus polysulfide, e.g., $P_2S_5$ or $P_4S_3$, as illustrated by the equation:

$$RCF_2CFICF_2R \xrightarrow{P_2S_5} RCF_2C=SCF_2R$$

wherein the R groups are hydrogen, halogen, alkyl, and haloalkyl. Preferably, the polyfluoroalkyl iodide is introduced in vapor form into the refluxing phosphorus polysulfide and the volatile polyfluorothioketone which is formed is collected in a receiver cooled below the boiling point of the polyfluorothioketone, e.g., in a trap cooled by a mixture of solid carbon dioxide and acetone. The polyfluorothioketone isolated in the cold receiver can be purified if desired by fractional distillation, usually under reduced pressure.

The above reaction is conveniently carried out at atmospheric pressure at the temperature of the refluxing phosphorus sulfide, e.g., at 525° C. when $P_2S_5$ is being used. The reaction between the polyfluoroalkyl iodide and the molten phosphorus sulfide takes place rapidly and the polyfluorothioketone reaction product is removed from the reaction zone as it is formed. Best yields of the polyfluorothioketones are obtained when the vapor of the polyfluoroalkyl iodide is introduced at a fairly rapid rate into the molten phosphorus sulfide.

The secondary polyfluoroalkyl iodides used in the process can be made by known methods. For example, they can be made by the free radical addition of the appropriate fluoroalkyl iodide to a fluoroolefin. This and other methods for preparing fluoroalkyl iodides are described in "Aliphatic Fluorine Compounds" by Lovelace, Rausch, and Postelnek, Reinhold Publishing Corp., New York, 1958, pages 37–40.

The new compounds of this invention have fluorine, unsaturation and a sulfide group. These offer sources for reaction, e.g., oxidation to corresponding sulfones, or addition to double bond, e.g., by bromine. These compounds are generally colorless liquids. They are useful as denaturants for alcohol and as solvents for certain polymers containing fluorine and sulfur, such as,

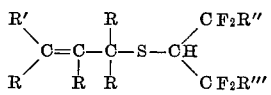

Products of the higher olefinic compounds are useful as lubricants and hydraulic fluids.

Since obvious modifications and equivalents in the invention will be evident to those skilled in the chemical arts, I propose to be bound solely by the appended claims.

The embodiments of the invention in which an exclusive propery or privilege is claimed are defined as follows:

1. Compounds in which all unsaturation is non-conjugated ethylenic of the formula

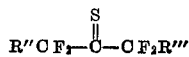

wherein: R″ and R‴ are selected from the class consisting of hydrogen, chlorine, fluorine and alkyl, chloroalkyl and fluoroalkyl of up to 6 carbons; each R is selected from the class consisting of hydrogen and aliphatic hydrocarbon of up to 4 carbons; and R′ is selected from the class consisting of hydrogen, cyano, carboxylic ester having an aliphatic hydrocarbon radical of up to 50 carbons, monovalent aliphatic hydrocarbon of up to 10 carbons, and divalent aliphatic hydrocarbon the free valence of which is joined to an R when R is hydrocarbon to form a carbocyclic radical of up to 6 carbons.

2. A process for preparing α-hydro-β-fluoroalkyl allyl sulfides which comprises reacting (1) an α-fluoroalkyl-thioketone of the formula

R″CF₂—C(=S)—CF₂R‴ wherein R″ and R‴ are selected from the class consisting of hydrogen, chlorine, fluorine, and alkyl, chloroalkyl and fluoroalkyl of up to 6 carbons, with (2) an ethylenic compound in which all unsaturation is nonconjugated ethylenic of the formula

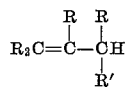

wherein each R is selected from the class consisting of hydrogen and aliphatic hydrocarbon of up to 4 carbons and R′ is selected from the class consisting of hydrogen, cyano, carboxylic ester having an aliphatic hydrocarbon radical of up to 50 carbons, monovalent aliphatic hydrocarbon of up to 10 carbons, and divalent aliphatic hydrocarbon the free valence of which is joined to an R when R is hydrocarbon to form a carbocyclic radical of up to 6 carbons.

3. The process of claim 2 wherein the thioketone is perfluoroacetone.

4. 2H-hexafluoro-2-propyl 1,1,2-trimethylallyl sulfide.

5. 2H-hexafluoro-2-propyl allyl sulfide.

6. 2H-hexafluoro-2-propyl 3-cyclopentenyl sulfide.

7. 2H-hexafluoro-2-propyl 2-heptenyl sulfide.

8. 4-(2H-hexafluoro-2-propylthio)-2-butene-nitrile.

9. The process which comprises reacting together tetramethylethylene and hexafluorothioacetone.

10. The process which comprises reacting together propylene and hexafluorothioacetone.

11. The process which comprises reacting together cyclopentene and hexafluorothioacetone.

12. The process which comprises reacting together heptene-1 and hexafluorothioacetone.

13. The process which comprises reacting together allyl cyanide and hexafluorothioacetone.

14. The process which comprises reacting together linseed oil and hexafluorothioacetone.

15. The reaction product of linseed oil and hexafluorothioacetone.

No references cited.

UNITED STATES PATENT OFFICE

CERTIFICATE OF CORRECTION

Patent No. 3,052,726　　　　　　　　　September 4, 1962

William J. Middleton

It is hereby certified that error appears in the above numbered patent requiring correction and that the said Letters Patent should read as corrected below.

Column 6, line 24, for "perfluoroacetone" read -- hexafluorothioacetone --; line 29, for "-2-butenenitrile" read -- -2-butenenitrile --.

Signed and sealed this 2nd day of April 1963.

(SEAL)
Attest:

ESTON G. JOHNSON
Attesting Officer

DAVID L. LADD
Commissioner of Patents